United States Patent
Lee et al.

(10) Patent No.: US 11,525,019 B2
(45) Date of Patent: Dec. 13, 2022

(54) PROCESS FOR PREPARING ACRYLIC EMULSION RESIN

(71) Applicant: LG Chem, Ltd., Seoul (KR)

(72) Inventors: Seungmo Lee, Daejeon (KR); Seung Hun Yang, Daejeon (KR); Jungeun Woo, Daejeon (KR); Keu Yeun Park, Daejeon (KR); Jungeun Yeo, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 17/051,052

(22) PCT Filed: Dec. 16, 2019

(86) PCT No.: PCT/KR2019/017815
§ 371 (c)(1),
(2) Date: Oct. 27, 2020

(87) PCT Pub. No.: WO2020/130538
PCT Pub. Date: Jun. 25, 2020

(65) Prior Publication Data
US 2021/0122845 A1    Apr. 29, 2021

(30) Foreign Application Priority Data
Dec. 17, 2018  (KR) .......... 10-2018-0163343
Dec. 13, 2019  (KR) .......... 10-2019-0166930

(51) Int. Cl.
*C08F 8/36* (2006.01)
*C08F 2/28* (2006.01)
*C09J 133/08* (2006.01)

(52) U.S. Cl.
CPC .................. *C08F 8/36* (2013.01); *C08F 2/28* (2013.01); *C09J 133/08* (2013.01)

(58) Field of Classification Search
CPC .............. C08F 8/36; C08F 2/28; C09J 133/08
See application file for complete search history.

(56) References Cited

U.S. PATENT DOCUMENTS

| | | | |
|---|---|---|---|
| 4,645,711 A | 2/1987 | Winslow et al. | |
| 5,183,841 A * | 2/1993 | Bernard | C09J 133/08 524/272 |
| 5,322,731 A | 6/1994 | Callahan, Jr. et al. | |
| 5,420,195 A | 5/1995 | Mayer et al. | |
| 5,625,006 A | 4/1997 | Callahan, Jr. et al. | |
| 2005/0209382 A1 | 9/2005 | Yale et al. | |
| 2012/0058277 A1 | 3/2012 | Bohling et al. | |
| 2012/0136109 A1 | 5/2012 | Pafford, IV et al. | |
| 2014/0142238 A1 | 5/2014 | Guo | |
| 2015/0344746 A1 | 12/2015 | Ha et al. | |

FOREIGN PATENT DOCUMENTS

| | | | |
|---|---|---|---|
| CN | 1934206 A | | 3/2007 |
| CN | 102417560 A | | 4/2012 |
| CN | 102471418 A | | 5/2012 |
| CN | 106459711 A | | 2/2017 |
| EP | 0213860 B1 | | 1/1992 |
| KR | 940009040 B1 | | 9/1994 |
| KR | 100262136 B1 | | 7/2000 |
| KR | 20060131998 A | | 12/2006 |
| KR | 20140045883 A | | 4/2014 |
| KR | 20150100684 A | | 9/2015 |
| KR | 2018-0075307 | * | 7/2018 |
| KR | 20180075307 A | | 7/2018 |
| WO | 199906453 A1 | | 2/1999 |
| WO | 2017214962 A1 | | 12/2017 |
| WO | 2018112819 A1 | | 6/2018 |

OTHER PUBLICATIONS

International Search Report for Application No. PCT/KR2019/017815 dated Apr. 9, 2020, 2 pages.
Search Report dated Dec. 14, 2021 from Office Action for Chinese Application No. 201980030244.5 dated Dec. 22, 2021. 3 pgs.
Search Report for European Application No. 19897871.0 dated Jan. 17, 2022. 1 pg.

* cited by examiner

*Primary Examiner* — Robert D Harlan
(74) *Attorney, Agent, or Firm* — Lerner, David, Littenberg, Krumholz & Mentlik, LLP

(57) ABSTRACT

A process for preparing an acrylic emulsion resin is provided by introducing specific monomers at a certain time during an emulsion polymerization process, dispersion stability and adhesion properties of the acrylic emulsion resin are improved, thereby providing an aqueous acrylic pressure-sensitive adhesive that not only has excellent initial adhesion but also has low viscosity and improved processability, and high adhesion holding power.

14 Claims, No Drawings

PROCESS FOR PREPARING ACRYLIC EMULSION RESIN

CROSS-REFERENCE TO RELATED APPLICATIONS

The present application is a national stage entry under 35 U.S.C. § 371 of International Application No. PCT/KR2019/017815 filed on Dec. 16, 2019, which claims priority to Korean Patent Application No. 10-2018-0163343 filed on Dec. 17, 2018 and Korean Patent Application No. 10-2019-0166930 filed on Dec. 13, 2019, the disclosures of which are herein incorporated by reference in their entirety.

TECHNICAL FIELD

The present invention relates to a process for preparing acrylic emulsion resin having excellent adhesion properties and high dispersion stability.

BACKGROUND

A pressure-sensitive adhesive (PSA) is material that adheres to an adherend with a small pressure. It is viscoelastic material different from an adhesive, has basic properties of initial adhesion, adhesion, and cohesion, and is being used in various industrial fields such as printing, chemistry, medicine, household electrical appliances, automobiles, stationery, and the like.

A pressure-sensitive adhesive may be classified into acryl-based, rubber-based, silicon-based, EVA-based, and the like according to the monomers used, and classified into a solvent type, an emulsion type, a hot melt type, and the like according to the shape.

In the past, a rubber-based pressure-sensitive adhesive or a solvent type pressure-sensitive adhesive was mainly used for a pressure-sensitive adhesive tape and a pressure-sensitive adhesive label, and the like, but with the increase in demand for environmentally friendly pressure-sensitive adhesive, interest grew in non-solvent type pressure-sensitive adhesive, and technical development thereof was progressed. Currently, the use and production amount of non-solvent type pressure-sensitive adhesive significantly increased, and are expected to continuously increase in the future. Such a non-solvent type pressure-sensitive adhesive is prepared representatively by aqueous emulsion polymerization. Thus, it is required to generate less aggregate and stably realize excellent adhesion properties, so as to improve an economical efficiency and processability.

The aqueous pressure-sensitive adhesive prepared by the aqueous emulsion polymerization is in the form of a colloidal solution consisting of particles of hundreds of nanometers. In the emulsion polymerization, an emulsifier, particularly an anionic emulsifier is used to form particles and maintain a dispersed phase. However, if the amount of the emulsifier used increases, particle size may decrease against expectations, and the adhesion properties of the pressure-sensitive adhesive may be deteriorated.

In order to compensate this, polar monomers may be introduced during polymerization. They provide ionic groups between polymer chains to increase quantity of electric charge on the particle surface, thereby providing dispersion stability by electrostatic repulsive force. Further, adhesion to a polar substrate also increases. However, if the amount of the polar monomers increases above a certain amount, particle size may decrease, and the viscosity of the aqueous pressure-sensitive adhesive solution may significantly increase, and consequently, it may be difficult to apply in the later application process.

Thus, there is a continued demand for acrylic emulsion resin that maintains excellent adhesion properties and has low viscosity so as to be easily applied for the later application process.

DETAILED DESCRIPTION OF THE INVENTION

Technical Problem

It is an object of the present invention to provide a process for preparing acrylic emulsion resin having excellent adhesion properties and high dispersion stability.

It is another object of the present invention to provide an aqueous acrylic pressure-sensitive adhesive comprising the prepared acrylic emulsion resin.

Technical Solution

According to one embodiment of the invention, a process for preparing acrylic emulsion resin is provided, which comprises steps of:

introducing a monomer mixture comprising (meth)acrylic acid ester-based monomers including C1-14 alkyl groups, and one or more comonomers selected from the group consisting of vinyl ester-based monomers, styrene-based monomers, (meth)acrylic acid-based monomers, and hydroxy group-containing (meth)acrylic ester-based monomers for 2 hours or more, and conducting an emulsion polymerization reaction; and introducing a monomer represented by the following Chemical Formula 1 at the time from 60% of time to 93% of time among the total time for introducing the monomer mixture, after introducing the monomer mixture to initiate an emulsion polymerization reaction:

$$R_1\text{-}A\text{-}R_2 \qquad \text{[Chemical Formula 1]}$$

in Chemical Formula 1, $R_1$ is a functional group including a carbon-carbon unsaturated bond capable of progressing a radical reaction, A is a single bond, a C1-10 linear or branched alkylene group, or a C6-20 arylene group, and $R_2$ is a functional group with a strong negative charge, or a salt thereof.

According to another embodiment of the invention, an aqueous acrylic pressure-sensitive adhesive comprising the acrylic emulsion resin prepared by the above explained process is provided.

Advantageous Effects

As described above, in the present disclosure, a process for preparing an acrylic emulsion resin comprises introducing specific monomers at a certain time during an emulsion polymerization process, and thus dispersion stability and adhesion properties of the acrylic emulsion resin may be improved. Also, the aqueous acrylic pressure-sensitive adhesive according to the present invention not only has excellent initial adhesion but also has improved processability and high adhesion holding power.

DETAILED DESCRIPTION OF THE EMBODIMENTS

In the present disclosure, the terms "the first", "the second", and the like are used to describe a variety of components, and these terms are merely employed to distinguish a certain component from other components.

The terminology used herein is for the purpose of describing particular embodiments only and is not intended to be limiting of the invention. The singular forms are intended to include the plural forms as well, unless the context clearly indicates otherwise. It will be further understood that the terms "include", "have", or "comprise" when used in this specification, specify the presence of stated features, numbers, steps, components, or combinations thereof, but do not preclude the presence or addition of one or more other features, numbers, steps, components, or combinations thereof.

Throughout the specification, the terms "about", "substantially", and the like are used as meanings close to a numerical value when preparation and material tolerance unique to the mentioned meaning is presented, and used to prevent an unconscionable violator from unfairly using the disclosure in which exact or absolute numerical values are mentioned for better understanding of the invention.

As used herein, (meth)acrylic acid includes both acrylic acid and methacrylic acid.

As used herein, (co)polymer includes both homo-polymer and copolymer.

Unless otherwise defined, "copolymerization" means block copolymerization, random copolymerization, graft copolymerization or alternating copolymerization, and "copolymer" means block copolymer, random copolymer, graft copolymer or alternating copolymer.

Although various modifications can be made to the present invention and the present invention may have various forms, specific examples will be illustrated and explained in detail below. However, it should be understood that these are not intended to limit the present invention to specific disclosure, and that the present invention includes all the modifications, equivalents or replacements thereof without departing from the spirit and technical scope of the invention.

Hereinafter, a process for preparing acrylic emulsion resin and aqueous acrylic pressure-sensitive adhesive comprising the prepared acrylic emulsion resin according to specific embodiments of the invention will be explained.

In the present invention, by introducing specific monomers at a certain time after initiating an emulsion polymerization reaction during the polymerization process of acrylic emulsion resin for aqueous pressure-sensitive adhesive, the effect of improvement in dispersion stability and adhesion properties may be obtained by increase in the specific monomers. Further, excellent effect may also be obtained in that low viscosity can be maintained to improve processability in the application process of aqueous pressure-sensitive adhesive such as dispersion, coating, and the like.

In general, an aqueous pressure-sensitive adhesive is prepared in the form of a colloidal solution consisting of particles of hundreds of nanometers by emulsion polymerization. In the emulsion polymerization, an emulsifier, particularly an anionic emulsifier is used to form particles and maintain a dispersed phased. However, if the amount of the emulsifier used increases, particle size decreases against expectations, and the adhesion properties of the pressure-sensitive adhesive decreases. In order to compensate this, polar monomers may be introduced during polymerization. They provide ionic groups between polymers chains to increase quantity of electric charge on the particle surface, thereby providing dispersion stability by electrostatic repulsive force. Further, adhesion to a polar substrate increases. However, if the amount of polar monomers increases above a certain amount, particle size may decrease, viscosity of the aqueous pressure-sensitive adhesive solution may significantly increase, and thus, it may be difficult to apply for the later application process.

Thus, the present invention changes the introduction time of polar monomers in the polymerization process of an aqueous pressure-sensitive adhesive, thereby increasing dispersion stability and adhesion properties by increase in polar monomers.

Specifically, a process for preparing acrylic emulsion resin according to the embodiment of the invention comprises steps of: introducing a monomer mixture comprising (meth)acrylic acid ester-based monomers including C1-14 alkyl groups, and one or more comonomers selected from the group consisting of vinyl ester-based monomers, styrene-based monomers, (meth)acrylic acid-based monomers, and hydroxy group-containing (meth)acrylic ester-based monomers for 2 hours or more, and conducting an emulsion polymerization reaction; and introducing a monomer represented by the following Chemical Formula 1 at the time from 60% of time to 93% of time among the total time for introducing the monomer mixture, after introducing the monomer mixture to initiate an emulsion polymerization reaction:

$$R_1\text{-}A\text{-}R_2 \qquad \text{[Chemical Formula 1]}$$

in Chemical Formula 1, $R_1$ is a functional group including a carbon-carbon unsaturated bond capable of progressing a radical reaction, A is a single bond, a C1-10 linear or branched alkylene group, or a C6-20 arylene group, and $R_2$ is a functional group with a strong negative charge, or a salt thereof.

As used herein, "the introduction time of polar monomers" refers to a time when the polar monomers are introduced at once, or a time when the first introduction of the polar monomers begins in portionwise introduction.

Particularly, in the prior art, regardless of the kind of monomers, all the monomers are emulsified with an emulsifier and introduced into a reactor at the beginning of polymerization, but in the present invention, monomers other than the polar monomers of Chemical Formula 1 are emulsified and introduced into a reactor, and the polar monomers of Chemical Formula 1 are introduced after acrylic emulsion resin particles are partly formed, and used to increase surface charge.

The emulsion polymerization reaction of the present invention is carried out while introducing a monomer mixture for a predetermined time into a reactor or the emulsion polymerization reaction. Specifically, the emulsion polymerization reaction is carried out while introducing a monomer mixture for about 2 hours or more. For example, the total time for which the monomer mixture is introduced may be about 2 hours or more, or about 2 hours to about 8 hours, or about 3 hours or more, or about 3 hours to about 6.5 hours, or about 3.5 hours or more, or about 3.5 hours to about 5.5 hours. The emulsion polymerization reaction of the present invention should be carried out while introducing the monomer mixture for about 2 hours or more so as to minimize generation of aggregate. Further, it may be preferable that the emulsion polymerization reaction is carried out while introducing the monomer mixture within about 8 hours, so as to improve productivity.

In the present invention, the polar monomers of Chemical Formula 1 should be introduced after the monomer mixture begins to be introduced to progress an emulsion polymerization reaction and acrylic emulsion resin particles are sufficiently formed, namely, after 60% of time among the total time for introducing the monomer mixture elapses. Specifically, the polar monomers of Chemical Formula 1 may be introduced or begin to be introduced when about 65% of time among the total time for introducing the monomer mixture elapses, or about 75% or about 80% of time elapses, after initiating the emulsion polymerization reaction.

For example, in case the monomer mixture comprising (meth)acrylic acid ester-based monomers, and the like is introduced for about 2 hours, the polar monomers of Chemical Formula 1 may be introduced when about 1 hour and 12 minutes elapse after the initiation of the emulsion polymerization reaction, or may be introduced when about 1 hour and 18 minutes, or about 1 hour and 30 minutes, or about 1 hour and 36 minutes elapse. For another example, in case the monomer mixture is introduced for about 5 hours, the polar monomers of Chemical Formula 1 may be introduced when about 3 hours elapse after the initiation of the emulsion polymerization reaction, or may be introduced when about 3 hours and 15 minutes, or about 3 hours and 45 minutes, or about 4 hours elapse. For another example, in case the monomer mixture is introduced for about 8 hours, the polar monomers of Chemical Formula 1 may be introduced when about 4 hours and 48 minutes elapse after the initiation of the emulsion polymerization reaction, or may be introduced when about 5 hours and 12 minutes, or about 6 hours, or about 6 hours and 24 minutes elapse.

If the polar monomers of Chemical Formula 1 are emulsified with an emulsifier and introduced at the beginning of the emulsion polymerization reaction, namely, introduced before 60% of the monomer mixture introduction time is reached, the polar monomers may be distributed inside of the particles rather than on the particle surface, and it may be difficult to form a network structure between polymer chains, and consequently, adhesion properties, particularly, shear strength may decrease. Particularly, if the polar monomers of Chemical Formula 1 are introduced before acrylic emulsion resin particles are sufficiently formed as explained above, even if polar monomers are additionally introduced later, improvement in viscosity and adhesion of the produced acrylic emulsion resin may not be significantly influenced, and shear strength may decrease to the contrary.

Further, the polar monomers of Chemical Formula 1 should be introduced before about 93% of the monomer mixture introduction time, so that they may provide ionic groups between polymer chains to increase quantity of electric charge on the particle surface, thereby securing dispersion stability by electrostatic repulsive force. Specifically, the polar monomers of Chemical Formula 1 may be introduced at once or portionwise before about 93% of time among the total time for introducing the monomer mixture elapses, or within about 90%, or within about 85%, or within about 80%, after the initiation of the emulsion polymerization reaction. Particularly, when the polar monomers are introduced portionwise, a time when the first introduction begins may be before about 85% of time among the total time for introducing the monomer mixture elapses, or before about 80% of time elapses, after the initiation of the emulsion polymerization reaction. Further, in case the polar monomers are introduced at once, a time when the first introduction begins may be preferably before about 85% of time among the total time for introducing the monomer mixture elapses, or before about 80% of time elapses, after the initiation of the emulsion polymerization reaction. In case the polar monomers of Chemical Formula 1 are introduced after about 93% of time among the total time for introducing the monomer mixture elapses, the polar monomers may not be positioned on the particle surface, and may form polymer particles or aqueous polymer of the polar monomers only.

For example, in case a monomer mixture comprising (meth)acrylic acid ester-based monomers, and the like is introduced for about 2 hours, the polar monomers of Chemical Formula 1 may be introduced before about 1 hours and 48 minutes elapse, or before about 1 hour and 42 minutes elapse, after the initiation of the emulsion polymerization reaction. For another example, in case the monomer mixture is introduced for about 5 hours, the polar monomers of Chemical Formula 1 may be introduced before about 4 hours and 30 minutes elapse, or before about 4 hour and 15 minutes elapse, after the initiation of the emulsion polymerization reaction. For another example, in case the monomer mixture is introduced for about 8 hours, the polar monomers of Chemical Formula 1 may be introduced before about 6 hours and 48 minutes elapse, or before about 7 hours and 12 minutes elapse, after the initiation of the emulsion polymerization reaction.

Meanwhile, the polar monomers of Chemical Formula 1 have both a functional group (namely, $R_1$) including a carbon-carbon unsaturated bond capable of progressing a radical reaction, and a functional group with a strong negative charge or a salt thereof (namely, $R_2$).

The monomer of Chemical Formula 1 may be copolymerized with polymer particles because $R_1$ comprises $C=C$ double bond structure, and for example, $R_1$ may be a vinyl group or an allyl group. Further, $R_2$ is an ionic group with a strong negative charge, and for example, it may be sulfonate, sulfite, or sulfate. Although A is not limited in terms of its structure, it may be a single bond, a C1-10 linear or branched alkylene group, or a C6-20 arylene group. For example, A may be a single bond, a C1-4 alkylene group such as methylene, ethylene, propylene, butylene, and the like, or a C6-12 arylene group such as phenylene, and the like.

Specifically, as the monomer of Chemical Formula 1, one kind or two or more kinds selected from sodium allyl sulfonate, sodium methyl allyl sulfonate, sodium ethyl allyl sulfonate, sodium propyl allyl sulfonate, sodium butyl allyl sulfonate, sodium styrene sulfonate, and sodium allyl sulfate, and the like may be used. Among them, in terms of reactivity with other copolymers, sodium methyl allyl sulfonate, sodium styrene sulfonate, and sodium allyl sulfate may be used.

The monomer of Chemical Formula 1 may be introduced in the amount of about 0.05 parts by weight to about 1.0 part by weight, or about 0.25 parts by weight to about 0.65 parts by weight, or about 0.3 parts by weight to about 0.5 parts by weight, based on 100 parts by weight of the total amount of the monomers and comonomers included in the monomer mixture. Wherein, the monomer of Chemical Formula 1 may be used in the amount of about 0.05 parts by weight, so as to realize emlusion resin having low viscosity through the increase in quantity of electric charge on the particle surface. However, if the polar monomers are excessively included based on the total amount of the emulsion including the monomer mixture, the emulsion state of the emulsion may become unstable, and thus, an oil phase and an aqueous phase may be separated. Particularly, if the monomers of Chemical Formula 1 are introduced in an amount greater than about 1.0 part by weight, separate water-soluble resin such as a polymer emulsifier may be generated in a great quantity, and thus, due to increase in foaming, it may be difficult to apply in the later application processes.

Further, the polar monomers of Chemical Formula 1 may be introduced at once in the total introduction amount, or may be introduced portionwise in divided portions of the total introduction amount at two or more times. Specifically, the polar monomers of Chemical Formula 1 may be continuously introduced for a certain time, for example, may be continuously introduced for a time corresponding to about 10% to about 40%, or 15% to 30%, or about 20% to 25% of the total introduction time of the monomer mixture.

For example, in case the polar monomers of Chemical Formula 1 are continuously introduced, when the total introduction time of the monomer mixture is 2 hours to 8 hours, the polar monomers may be introduced for about 0.2 hours to about 3.2 hours, or about 0.3 hours to about 2.4 hours, about 0.45 hours to about 1.95 hours, about 0.6 hours to about 1.7 hours, or 0.7 hours to about 1.4 hours. Specifically, when the total introduction time of the monomer mixture is 2 hours, the polar monomers may be continuously introduced for about 12 minutes to about 48 minutes, or about 18 minutes to about 36 minutes, or about 24 minutes to about 30 minutes.

The monomer of Chemical Formula 1 may be mixed with the monomer mixture and introduced together, or may be introduced alone. For example, the polar monomers of Chemical Formula 1 may be mixed with an emulsion including the monomer mixture and continuously introduced together with the emulsion.

Meanwhile, monomers other than the polar monomers of Chemical Formula 1 may be emulsified in the presence of an emulsifier and introduced into a reactor, thus conducting an emulsion polymerization reaction.

In the present invention, the monomer mixture for conducting the emulsion polymerization process comprises (meth)acrylic acid ester-based monomers including C1-14 alkyl groups, and one or more comonomers selected from the group consisting of vinyl ester-based monomers, styrene-based monomers, (meth)acrylic acid-based monomers, and hydroxyl group-containing (meth)acrylic ester-based monomers.

Throughout the specification, the term "monomer mixture" refers to a state wherein one or more monomers explained below are mixed with acryl-based monomers, and the one or more monomers may be introduced together or sequentially introduced to prepare the monomer mixture, and the preparation method is not limited.

The (meth)acrylic acid ester monomers are (meth)acrylic acid ester monomers having C1-14 alkyl groups, and are not limited as long as they are materials known in the art. For example, the (meth)acrylic acid ester monomers may be one or more selected from the group consisting of methyl(meth) acrylate, ethyl(meth)acrylate, propyl(meth)acrylate, isopropyl(meth)acrylate, butyl(meth)acrylate, isobutyl(meth)acrylate, t-butyl(meth)acrylate, n-amyl(meth)acrylate, isoamyl(meth)acrylate, n-hexyl(meth)acrylate, n-heptyl(meth)acrylate, n-octyl(meth)acrylate, t-octyl(meth)acrylate, n-ethylhexyl(meth)acrylate, 2-ethylhexyl(meth)acrylate, decyl(meth)acrylate, isodecyl(meth)acrylate, tridecyl(meth) acrylate, stearyl(meth)acrylate, isostearyl(meth)acrylate, phenyl(meth)acrylate, benzyl(meth)acrylate, dodecyl(meth) acrylate, and cyclohexyl(meth)acrylate, lauryl(meth)acrylate, ceryl(meth)acrylate, glycidyl(meth)acrylate, and stearyl(meth)acrylate, and combinations of two or more may be used. Specifically, one or two or more selected from methyl(meth)acrylate, ethyl(meth)acrylate, butyl(meth) acrylate and 2-ethylhexyl(meth)acrylate may be preferably used.

The (meth)acrylic acid ester monomers may be included in the amount of about 70 parts by weight to about 99.9 parts by weight, or about 80 parts by weight to about 99.5 parts by weight, or about 82 parts by weight to about 99 parts by weight, or about 85 parts by weight to about 98.5 parts by weight, based on 100 parts by weight of the total amount of the (meth)acrylic acid ester-based monomers and comonomers in the monomer mixture. If the content of the (meth) acrylic acid ester monomers is less than about 70 parts by weight, initial adhesion may not be secured, and thus, adhesion to an adherend may not be achieved. Further, if the content of the (meth)acrylic acid ester monomers is greater than about 99.9 parts by weight, adhesion holding to an adherend may decrease, and thus, detachment by pressure may occur after a certain time elapses.

According to more preferable embodiment of the invention, among the (meth)acrylic acid ester-based monomers, methyl(meth)acrylate may be included in the amount of about 0 to about 20 parts by weight, and remaining (meth) acrylic acid ester monomers such as butyl(meth)acrylate and 2-ethylhexyl(meth)acrylate may be included in the monomer mixture in the amount of about 50 parts by weight to about 99.9 parts by weight, based on 100 parts by weight of the total amount of (meth)acrylic acid ester-based monomers and comonomers. Particularly, in case the monomer mixture consists only of monomers having long chain alkyl groups such as butyl(meth)acrylate and 2-ethylhexyl(meth)acrylate, glass transition temperature(Tg) of the resin may become very low, and soft polymer may be formed, thus significantly generating residue. Thus, it is preferable that the monomer mixture is appropriately composed of monomers and comonomers. Since the properties of the pressure-sensitive adhesive results from the glass transition temperature(Tg) of the resin, each content rate of monomers and comonomers is important. It is preferable to adjust the rate of remaining monomers so as to obtain appropriate adhesion properties.

For reference, as used herein, "part by weight" is a relative concept showing the weight of remaining materials as a ratio, based on the weight of any material. For example, in a mixture comprising 50 g of A material, 20 g of B material, and 30 g of C material, the amounts of the B material and C material, based on 100 parts by weight of the A material, are 40 parts by weight and 60 parts by weight, respectively.

Further, "% by weight (wt %)" is an absolute concept showing the weight of any material in the total weight as a percentage. In the above exemplified mixture, the contents of A material, B material, and C material in 100% of the total weight of the mixture are 50% by weight, 20% by weight, and 30% by weight, respectively.

As used herein, the term "monomer mixture" refers to a state wherein one or more monomers explained below are mixed with acryl-based monomers, and the one or more monomers may be introduced together or sequentially introduced to prepare the monomer mixture, and the preparation method is not limited.

The monomer mixture further comprises one or more comonomers selected from the group consisting of vinyl ester-based monomers, styrene-based monomers, (meth) acrylic acid-based monomers, and hydroxy group-containing (meth)acrylic ester-based monomers, in addition to the (meth)acrylate-based monomers. As explained, the comonomers may be introduced together or sequentially introduced to prepare the monomer mixture, and the preparation method is not limited.

As the vinyl ester-based monomers, vinyl acetate, allyl acetate, vinyl propionate, vinyl butyrate, vinyl laurate, or 1-vinyl-2-pyrrolidinone, and the like may be mentioned, but they are not limited thereto. Wherein, the vinyl ester-based monomers may be included in the content of about 0 to about 20 parts by weight, or about 0 to about 15 parts by weight, or about 3 to about 12 parts by weight, based on 100 parts by weight of the total weight of the (meth)acrylic acid ester-based monomers and comonomers in the monomer mixture.

As the styrene-based monomers, styrene or styrene substituted with C1-4 alkyl may be mentioned, wherein the C1-4 alkyl may be methyl, ethyl, propyl, or butyl. For example, as the styrene-based monomers, styrene, o-methyl styrene, m-methyl styrene, or p-methyl styrene, and the like may be mentioned, but they are not limited thereto. Wherein, the styrene-based monomers may be included in the content of about 0 to about 10 parts by weight, or about 0 to about 8 parts by weight, or about 1 to about 5 parts by weight, based on 100 parts by weight of the total weight of the (meth)acrylic acid ester-based monomers and comonomers in the monomer mixture.

As the (meth)acrylic acid-based monomers, acrylic acid, crotonic acid, methacrylic acid, or ethylmethacrylic acid, and the like may be mentioned, but they are not limited thereto. Wherein, the (meth)acrylic acid-based monomers may be included in the content of about 0.1 to about 5 parts by weight, or about 0.3 to about 3 parts by weight, or about 0.5 to about 2 parts by weight, based on 100 parts by weight of the total weight of the (meth)acrylic acid ester-based monomers and comonomers in the monomer mixture.

As the hydroxyl group-containing (meth)acryl ester-based monomers, hydroxyl methyl (meth)acrylate, hydroxyethyl (meth)acrylate, hydroxypropyl (meth)acrylate, hydroxybutyl (meth)acrylate, hydroxyhexyl (meth)acrylate, hydroxyoctyl (meth)acrylate, hydroxylauryl (meth)acrylate, or hydroxypropyleneglycol (meth)acrylate, and the like may be mentioned, but they are not limited thereto. Wherein, the hydroxyl group-containing (meth)acryl ester-based monomers may be included in the content of about 0 to about 5 parts by weight, or about 0 to about 2.5 parts by weight, or about 0.5 to about 2 parts by weight, based on 100 parts by weight of the total weight of the (meth)acrylic acid ester-based monomers and comonomers in the monomer mixture.

Meanwhile, the comonomers may be added in the content of about 0.1 to about 30 parts by weight, or about 0.5 to about 20 parts by weight, or about 1 to about 18 parts by weight, or about 1.5 to about 15 parts by weight, based on 100 parts by weight of the total weight of the (meth)acrylic acid ester-based monomers and comonomers in the monomer mixture. If the content of the comonomers are greater than about 30 parts by weight, the pressure-sensitive adhesive may become excessively firm, and thus, adhesion may be deteriorated. However, if the pressure-sensitive adhesive becomes too soft, excessive adhesion property may be exhibited to generate transcription, and thus, it is preferable to include the comonomers above the minimum content.

For example, the monomer mixture may comprise about 30 to about 90 parts by weight of ethylhexylacrylate, 0 to about 40 parts by weight of butylacrylate(BA), 0 to about 20 parts by weight of methylmethacrylate, 0 to about 20 parts by weight of vinylacetate(VAc), 0 to about 10 parts by weight of styrene, about 0.1 to about 5 parts by weight of acrylic acid, and 0 to about 5 parts by weight of hydroxyethylacrylate, based on 100 parts by weight of the total amount of the (meth)acrylic acid ester-based monomers and comonomers.

Meanwhile, according to one embodiment of the invention, the monomer mixture may comprise other additives without limitations, in addition to the above explained components, in the range within which the aimed effects are not hindered. For example, as the additives, an emulsifier, a cross-linking agent, an internal cross-linking agent, an external cross-linking agent, a buffering agent, a wetting agent, a reducing agent, a polymerization initiator, and the like may be mentioned, and one kind thereof or two or more kinds thereof may be further included.

The emulsifier is used for the production of the initial particles during the polymerization reaction of the monomer mixture, size control of the produced particles, and stability of the particles, and the like. In the present invention, as the emulsifier, one or more selected from the group consisting of sodium polyoxyethylene alkyl ether sulfate (various kinds according to EO groups) such as sodium polyoxyethylene lauryl ether sulfate, and the like, dioctyl sodium sulfosuccinate, sodium dodecyl diphenyl ether disulfonate, sodium dodecyl sulfate, sodium lauryl sulfate, and sodium dodecyl benzene sulfonate may be used. The emulsifier may be used in the content of about 0.5 to about 3 parts by weight, or about 1 to about 2 parts by weight, based on 100 parts by weight of the total amount of the (meth)acrylic acid ester-based monomers and comonomers.

The cross-linking agent may be one or more selected from the group consisting of methacrylamidoethyl ethyleneurea, tri(ethylene glycol) diacrylate, allyl methacrylate, hexadecanol dicarylate, poly(ethylene glycol) diacrylate, polypropyleneglycol diacrylate, 1,6-hexanediol diacrylate, trimethylolpropane triacrylate, ethoxylated trimethylpropane triacrylate, tripropyleneglycol diacrylatge, 1,3-butanediol diacrylate, pentaerythritol triacrylate, 3-trimethoxysilyl propylmethacrylate, vinyltrimethoxysilane, and divinylbenzene. The cross-linking agent may be used in the content of about 0 to about 1.5 parts by weight, or about 0.1 to about 1 part by weight, based on 100 parts by weight of the total amount of the (meth)acrylic acid ester-based monomers and comonomers.

The internal cross-linking agent may be one or more selected from the group consisting of allyl methacrylate, popyethyleneglycol diacrylate, polycarbodiimide, allyl-N-methylcarbamate, 1,6-hexanediol diacrylate, hexnadiol ethoxylate diacrylate, hexanediol propoxylate diacrylate, pentaerythritol ethoxylate triacrylate, pentaerythritol propoxylate triacrylate, vinyltrimethoxy silane, and divinyl benzene. Wherein, the internal cross-linking agent may be used in the content of about 0 to about 0.5 parts by weight, based on 100 parts by weight of the total amount of the (meth)acrylic acid ester-based monomers and comonomers.

As the external cross-linking agent, diacetone acrylamide (DAAM) and adipic acid dihydride(ADH) may be used so that a cross-linking reaction may additionally occur outside. The external cross-linking agent may be added later at the end of the polymerization process, and also perform a function as an intercross linker connecting between polymers. The external cross-linking agent may be used in the content of about 0 to about 1.0 part by weight, based on 100 parts by weight of the total amount of the (meth)acrylic acid ester-based monomers and comonomers.

As the polymerization initiator, water soluble polymerization initiators such as ammonium or alkali metal persulfate (ex. APS, ammonium persulfate), hydrogen peroxide, peroxide, hydroperoxide, and the like may be used, and it may be used together with one or more reducing agents so as to conduct an emulsion polymerization reaction at low temperature, but not limited thereto. Wherein, the content of the polymerization initiator may be about 0 to about 5 parts by weight, or about 0.1 to about 4.5 parts by weight, or about 0.5 to about 3 parts by weight, based on 100 parts by weight of the total amount of the (meth)acrylic acid ester-based monomers and comonomers. Further, the polymerization initiator may be appropriately divided in a portion or more in the above explained content range during the polymerization of the monomer mixture. Further, the external cross-linking agent that is added later at the end of the polymerization process and performs a function as an intercross linker connecting between polymers may be additionally used together.

As the buffer, sodium bicarbonate, sodium carbonate, sodium phosphate, sodium sulfate, sodium chloride, sodium hydroxide, and the like may be mentioned, but it is not limited thereto. Further, it may be used alone or in combinations of two or more kinds. The buffer may perform a function for controlling pH during a polymerization reaction, and providing polymerization stability. The buffer may be used in the content of about 0.05 to about 0.8 parts by weight, or about 0.1 to about 0.5 parts by weight, based on 100 parts by weight of the total amount of the (meth)acrylic acid ester-based monomers and comonomers.

The wetting agent performs a function as an emulsifier lowering surface tension so as to give coatability, and may be used in the content range well known in the art. For example, as the wetting agent, dioctyl sodium sulfosuccinate (DOSS)-based compounds may be mentioned. The wetting agent may be used in the content of about 0.1 to about 2 parts by weight, based on 100 parts by weight of the total amount of the (meth)acrylic acid ester-based monomers and comonomers.

Meanwhile, the monomer mixture may further comprise a molecular weight controlling agent, which performs a function as a chain transfer agent (CTA) during the polymerization reaction of resin. For example, the molecular weight controlling agent may also perform a function for being attached to the end of a molecule to move radicals elsewhere and conduct a termination reaction. As the molecular weight controlling agent, one or more selected from the group consisting of n-DDM(1-dodecanethiol) 3-mercaptopropionic acid may be mentioned. The molecular weight controlling agent may be used in the content of about 0 to about 0.3 parts by weight, based on 100 parts by weight of the total amount of the (meth)acrylic acid ester-based monomers and comonomers.

Further, in order to smoothly conduct the polymerization process, the introduction sequence of each component may be varied. For example, at the beginning of the polymerization process, additives such as an emulsifier and a buffer, and the like may be first dissolved in water under stirring, and then, a monomer mixture of (meth)acrylic acid ester monomers and comonomers, an emulsifier, an internal cross-linking agent, and the like may be introduced while stirring.

The emulsion polymerization may be carried out under stirring at a temperature of about 70° C. to about 90° C. for about 3 to about 10 hours in the presence of a polymerization initiator. Specifically, the emulsion polymerization may be carried out at a polymerization temperature of about 72° C. to about 88° C., or about 75° C. to about 85° C. considering the properties of the pressure-sensitive adhesive, and it may be carried out for about 3.5 to about 8 hours, or about 4 to about 6.5 hours. Further, it may be controlled by using a polymerization initiator alone or in combination with one or more reducing agents. The polymerization initiator and reducing agent, and the like used in the polymerization reaction are not specifically limited in terms of the component and content used in the acrylic emulsion resin of the present invention. In order to reduce residual monomers, previously, a stripping process was applied to remove them with water using a vacuum device, but recently, a time for which a polymerization initiator is introduced was extended to additionally progress aging at high temperature, thus extending the time so as to conduct additional reactions. If a reaction is continued at high temperature, a change over time may be significantly reduced and safer products can be provided.

As explained above, the process for preparing acrylic emulsion resin according to one embodiment of the invention can improve adhesion properties as well as dispersion stability by increase in polar monomers, by introducing polar monomers at a certain time during the emulsion polymerization process. Particularly, while the particles prepared by the present invention maintain the same particle size, quantity of electric charge increase as the amount of polar monomers on the surface increases, thus remarkably improving dispersion stability by electrostatic repulsive force.

Meanwhile, according to another embodiment of the invention, an aqueous acrylic pressure-sensitive adhesive comprising the acrylic emulsion resin prepared by the above explained process is provided.

The aqueous acrylic pressure-sensitive adhesive according to the present invention is characterized in that dispersion stability and adhesion properties are improved by increase in specific monomers, by introducing specific monomers at a certain time after initiating an emulsion polymerization reaction during the polymerization of acrylic emulsion resin.

The acrylic emulsion resin may have particle diameter of about 150 nm to about 1000 nm, or about 300 nm to about 500 nm. The particle diameter of the resin may be measured by a method well known in the art, using a common particle size analyzer, for example, Nicomp, CW380. Wherein, a method for measuring the particle diameter of the resin is as described in the experimental examples below, and explanations of the specific method or conditions are omitted.

Further, the acrylic emulsion resin may have a viscosity of about 850 cP or less or about 50 cP to about 850 cP, or about 750 cP or less or about 50 cP to about 750 cP, or about 600 cP or less or about 50 cP to about 600 cP. The acrylic emulsion resin may maintain low viscosity as explained above, thereby improving processability in the application process of aqueous pressure-sensitive adhesive such as dispersion, coating, and the like. The viscosity of the resin may be measured using a common viscometer by a method well known in the art, and for example, the viscosity of resin may be measured using Brookfield viscometer, using Lv62 spindle under 30 RPM condition. Wherein, the method for measuring the viscosity of resin is described in the experimental examples below, and explanations of the specific method or conditions are omitted.

Meanwhile, the aqueous acrylic pressure-sensitive adhesive may have loop tack of about 5 N/inch or more or about 5 N/inch to about 25 N/inch, or about 10 N/inch or more or about 10 N/inch to about 25 N/inch, or about 15 N/inch or more or about 15 N/inch to about 20 N/inch, or about 16 N/inch or more or about 16 N/inch to about 20 N/inch. Wherein, the loop tack may be measured according to FTM 9 of FINAT test method, and it may be measured using a glass or high density polyethylene(HDPE) film, or a bright stainless steel plate as an adherend. For example, a test specimen is made in a loop shape and fixed to a clamp, and the test specimen is attached to a glass or high density polyethylene(HDPE) film at a constant speed. And then, after about 5 seconds, when applying a speed of about 300 mm/min to separate to the opposite direction, a force corresponding to the maximum is measured as loop tack peel strength. For example, the pressure-sensitive adhesive test specimen may be prepared in the size of 1 inch×20 cm.

The aqueous acrylic pressure-sensitive adhesive may have 90° peel of about 3 N/inch or more or about 3 N/inch to 15 N/inch, or about 7.2 N/inch or more or about 7.2 N/inch to 11 N/inch, or about 7.5 N/inch or more or about 7.5 N/inch to 10 N/inch.

Wherein, peel may be measured according to FINAT TEST METHOD NO. 2. For example, the test specimen of aqueous acrylic pressure-sensitive adhesive is reciprocated with a roller of about 2 kg once or more at a speed of about 300 mm/min and attached to a glass or high density polyethylene(HDPE) film, or bright stainless steel plate adherend, and aged at room temperature for about 20 minutes (under 23° C., 50% humidity conditions), and then, with 90° peeling at a speed of about 300 mm/min, measurement is carried out using TA Texture Analyzer. For example, the test specimen of pressure-sensitive adhesive may be prepared in the size of 1 inch×20 cm.

The aqueous acrylic pressure-sensitive adhesive may have shear of about 10 hours/1 inch·1 kg or more or about 10 hours/1 inch·1 kg to about 500 hours/1 inch·1 kg, or about 15 hours/1 inch·1 kg or more or about 15 hours/1 inch·1 kg to about 250 hours/1 inch·1 kg, or about 20 hours/1 inch·1 kg or more or about 20 hours/1 inch·1 kg to about 100 hours/1 inch·1 kg. Wherein, the shear may be measured according to Holding Power test (Shear test) method. For example, a bright stainless steel plate is prepared (Bright SUS: more glossy and more slippy), the test specimen of pressure-sensitive adhesive is reciprocated with a roller of about 2 kg two times and attached to the adherend, and then, shear is measured after dwell time of 20 minutes. For example, the test specimen of pressure-sensitive adhesive may be prepared in the size of 1 inch×20 cm. Specifically, after applying a constant load of about 1 kg at the bottom of a sample, a time when the sample of pressure-sensitive adhesive drops is measured the target value may be set as about 32 minutes or more.

Meanwhile, the aqueous acrylic pressure-sensitive adhesive according to the present invention is paper for a pressure-sensitive adhesive label, it may be coated and formed on one side or both sides of a pressure-sensitive adhesive sheet, and the adhesive layer may have a thickness of about 15 micrometers ($\mu$m) to 25 micrometers ($\mu$m).

The pressure-sensitive adhesive sheet comprising aqueous acrylic pressure-sensitive adhesive can provide excellent adhesion to various substrates requiring adhesion including a hard surface such as a cement wall or a steel sheet, as well as a flexible container surface such as a plastic container of pharmaceuticals or cosmetics, fancy goods, and the like. Thus, it may be used for films such as PVC, PET, PP, PE, and the like or paper sheets, or other sheets requiring adhesion. Specifically, it may be preferably used for art papers that are appropriately printed and applied to the surface of plastic, glass, box, electronic products, and the like, among paper sheets. According to the purpose of use, the art papers with a thickness of about 65 $\mu$m to 150 $\mu$m may be used, and commonly, white art papers having a thickness of about 80 $\mu$m and gloss on the surface may be preferably used.

In the pressure-sensitive adhesive label, a release paper coated with silicon may be laminated on the adhesive layer so as to coat and protect pressure-sensitive adhesive, increase storage of a product and secure leveling, and as the release paper, a kraft paper or a glassine paper having a thickness of about 100 $\mu$m to about 150 $\mu$m may be used.

Hereinafter, the actions and effects of the invention will be explained in more detail through specific examples of the invention. However, these examples are presented only as the illustrations of the invention and the scope of the right of the invention is not limited thereby.

EXAMPLES

Example 1

A monomer mixture was mixed with an emulsifier and water to conduct emulsion polymerization, thus preparing acrylic emulsion resin, as follows.

138 g of water was added into a glass reactor with a capacity of 3 L, and then the temperature was raised to 85° C. and maintained under nitrogen atmosphere. Separately, in order to prepare pre-emulsion, to a monomer mixture of 557 g of 2-ethylhexyl acrylate, 56 g of methylmethacrylate, 57 g of vinylacetate, 14 g of styrene, 4 g of acrylic acid, 14 g of hydroxyethyl acrylate, and 1.5 g of methacrylamidoethyl ethylene urea or N-(2-(2-oxoimidazolidin-1-yl)ethyl)methacrylamide(WAMII), a solution consisting of 22 g of the aqueous solution of 30 wt % sodium polyoxyethylene lauryl ether sulfate, 6 g of the aqueous solution of 60 wt % dioctyl sodium sulfosuccinate, 1.5 g of sodium hydroxide(NaOH) and 176 g of water was added and mixed with a stirrer to prepare cloudy emulsion.

In the glass reactor, 3 g of the aqueous solution of 20 wt % ammonium persulfate was added, and stirred for 5 minutes and dissolved. Into the glass reactor, the emulsion comprising a monomer mixture and 70 g of the aqueous solution of 3 wt % ammonium persulfate were simultaneously continuously introduced by dropping at a constant speed for total 5 hours and total 5.5 hours, respectively, and the temperature was raised to 85° C., thus conducting an emulsion polymerization reaction.

At this time, 3 g of sodium methyl allyl sulfonate was mixed with 12 g of water, When 4 hours elapsed after the emulsion comprising a monomer mixture began to be introduced into the glass reactor, the aqueous mixture of sodium methyl allyl sulfonate was mixed with the remaining emulsion, and then it was started to be introduced into the glass reactor. The addition of the mixture of sodium methyl allyl sulfonate and the remaining emulsion was continuously performed in an even amount for 1 hour.

After introducing all of aqueous ammonium persulfate solution and sodium methyl allyl sulfonate with the emulsion into the glass reactor as described above, while raising the temperature to 85° C. and maintaining for about 1 hour, the reaction of non-reacted monomers was completed. Then, the reaction mixture was cooled to a room temperature, thus preparing acrylic emulsion resin.

After the acrylic emulsion resin was cooled to a room temperature, an aqueous solution of sodium hydroxide of about 5 wt % concentration was added to control the pH to about 6.5.

Example 2

An acrylic emulsion pressure-sensitive adhesive composition was prepared by the same process as Example 1, except that the aqueous mixture comprising 3 g of sodium methyl allyl sulfonate and 12 g of water introduced at once into the glass reactor when 4 hours elapsed after beginning the introduction of the emulsion.

Example 3

An acrylic emulsion pressure-sensitive adhesive composition was prepared by the same process as Example 1, except that the aqueous mixture comprising 3 g of sodium methyl allyl sulfonate and 12 g of water was divided into two portions and then introduced into the glass reactor in 4 hours and 4.5 after beginning the addition of the emulsion. That is, each 7.5 g of the aqueous mixture was added into the glass reactor when 4 hours elapsed and when 4.5 hours elapsed after beginning the addition of the emulsion.

Comparative Example 1

A monomer mixture was mixed with an emulsifier and water to conduct emulsion polymerization, thus preparing acrylic emulsion resin, as follows.

In a glass reactor with a capacity of 3 L, 138 g of water was added, and the temperature was raised to 85° C. and maintained under nitrogen atmosphere. Separately, in order to prepare pre-emulsion, to a monomer mixture of 557 g of 2-ethylhexyl acrylate, 56 g of methylmethacrylate, 57 g of vinylacetate, 14 g of styrene, 4 g of acrylic acid, 14 g of hydroxyethyl acrylate, and 1.5 g of cross-linking agent (WAMII), a solution consisting of 22 g of the aqueous solution of 30 wt % sodium polyoxyethylene lauryl ether sulfate, 6 g of the aqueous solution of 60 wt % dioctyl sodium sulfosuccinate, 1.5 g of sodium hydroxide, 3 g of sodium methyl allyl sulfonate and 176 g of water was added and mixed with a stirrer to prepare cloudy emulsion.

3 g of the aqueous solution of 20 wt % ammonium persulfate was added into the glass reactor, and stirred for 5 minutes and dissolved. Into the glass reactor, the emulsion comprising the monomer mixture and 70 g of the aqueous solution of 3 wt % ammonium persulfate were evenly continuously introduced for 5 hours and 5.5 hours, respectively. Thereafter, the temperature of the reactant mixture was raised to 85° C. When 6.5 hours elapsed after beginning the introduction of the emulsion comprising the monomer mixture, the reactant mixture was cooled to a room temperature, and then an acrylic emulsion resin was produced.

After the acrylic emulsion resin was cooled to a room temperature, an aqueous ammonia solution of about 30 wt % concentration was added to control the pH to about 8.5.

Comparative Example 2

Acrylic emulsion resin was prepared by the same process as Example 1, except that sodium methyl allyl sulfonate was not introduced into the emulsion polymerization reaction.

Comparative Example 3

An acrylic emulsion pressure-sensitive adhesive composition was prepared by the same process as Example 1, except for carrying out the addition of sodium methyl allyl sulfonate more early. That is, 3 g of sodium methyl allyl sulfonate was mixed with 12 g of water. When 1 hour elapsed after beginning the introduction of the emulsion comprising the monomer mixture, the aqueous mixture of sodium methyl allyl sulfonate was mixed with the remaining emulsion, and then it was started to be introduced into the glass reactor. The addition of the mixture of sodium methyl allyl sulfonate and the remaining emulsion was continuously performed in an even amount for 4 hour.

Comparative Example 4

An acrylic emulsion pressure-sensitive adhesive composition was prepared by the same process as Example 1, except for carrying out the addition of sodium methyl allyl sulfonate more later. That is, 3 g of sodium methyl allyl sulfonate was mixed with 12 g of water. When 4 hours and 45 minutes elapsed after beginning the introduction of the emulsion comprising the monomer mixture, the aqueous mixture of sodium methyl allyl sulfonate was mixed with the remaining emulsion, and then it was started to be introduced into the glass reactor. The addition of the mixture of sodium methyl allyl sulfonate and the remaining emulsion was continuously performed in an even amount for 15 minutes.

Experimental Examples

Preparation of Pressure-Sensitive Adhesive Specimen Coated with Pressure-Sensitive Adhesive First, about 30 g of 50% rosin-based water-dispersible tackifier was added to 100 g of acrylic emulsion resin prepared in Examples and Comparatives, and stirred for about 30 minutes. Then, about 1 g of 65% sodium dodecyl sulfosuccinate was added into the reactant mixture, and stirred for about 30 minutes to produce acrylic pressure-sensitive adhesive compositions.

Each of the acrylic pressure-sensitive adhesive composition was applied on a silicon-coated release paper, and dried in an oven of about 120° C. for about 1 minute such that the thickness of the adhesive resin coating layer became about 20 μm. The adhesive resin coated on the silicon release paper was laminated with an art paper to prepare a pressure-sensitive adhesive sheet. The pressure-sensitive adhesive sheet was cut to a size of 25 mm×200 mm to prepare pressure-sensitive adhesive tape specimens.

Property Evaluation

The properties of the acrylic emulsion resins prepared in Examples and Comparative Examples, and the adhesive properties of the pressure-sensitive adhesive using the same were evaluated as follows. The results were shown in the following Table 1.

1) Measurement of Particle Diameter

For the prepared acrylic emulsion resin, particle diameter was measured using a particle size analyzer(Nicomp, CW380).

2) Measurement of Viscosity

For the prepared acrylic emulsion resin, viscosity was measured under 25±2° C. condition with a Brookfield viscometer, using Lv62 spindle under 30 RPM condition.

3) Measurement of Loop Tack

The above prepared pressure-sensitive adhesive sheet was measured according to FTM 9 of FINAT test method.

First, a test specimen of 1 inch×20 cm was prepared, and then, a release paper was removed and both sides of the sheet were folded to make a loop shape, and then, both ends were fixed. The loop was instantaneously attached to a stainless steel surface, and then, separated after about 5 seconds, and at this time, a force corresponding to the maximum was measured under 23° C., 50% humidity. 5 or more measurement specimens were prepared and measured, and then, averaged and shown in the following Table 1 as loop tack values.

4) Measurement of Peel

The above prepared pressure-sensitive adhesive sheet was measured according to FINAT TEST METHOD NO. 2.

First, a test specimen of 1 inch×20 cm was prepared, and attached to a stainless steel surface such that the attached side became 1 inch×1 inch or more, and then, reciprocated with a 2 kg roller two times to press. After about 20 minutes elapsed, a force when separating to the direction of 90° to the attached side at a speed of 300 mm/min was measured under 23° C. and 50% humidity. 5 or more specimens were prepared and measured, and then, averaged and shown in the following Table 1 as peel values.

5) Measurement of Shear

The above prepared pressure-sensitive adhesive sheet was measured according to Holding Power test (Shear test).

First, a test specimen of 1 inch×20 cm was prepared, and attached to a stainless steel surface such that the attached side became 1 inch×1 inch, and then, reciprocated with a 2 kg roller two times to press. After about 20 minutes elapsed, the attached sheet was attached to the wall side inclined about 2°, a weight of 1.0 kg load was hung at the bottom, and a time when the sheet dropped from the attached side was measured under 23° C. and 50% humidity.

TABLE 1

| | Particle diameter (nm) | Solid content (%) | Viscosity (cP) | Loop tack (N/inch) | 90° Peel (N/inch) | Shear (hr) |
|---|---|---|---|---|---|---|
| Example 1 | 350 | 57.0 | 410 | 16.4 | 8.1 | 24 |
| Example 2 | 320 | 57.3 | 450 | 16.0 | 7.5 | 28 |
| Example 3 | 330 | 57.2 | 420 | 16.1 | 7.7 | 26 |
| Comparative Example 1 | 290 | 57.5 | 270 | 17.0 | 8.5 | 6 |
| Comparative Example 2 | 350 | 58.0 | 860 | 14.8 | 6.9 | 35 |
| Comparative Example 3 | 310 | 57.2 | 310 | 16.8 | 8.1 | 11 |
| Comparative Example 4 | 350 | 57.4 | 790 | 15.2 | 7.1 | 32 |

From the results of Table 1, it was confirmed that Examples 1 to 3 not only exhibited low viscosity under equivalent solid content conditions, but also exhibit excellent effects in terms of adhesion properties of loop tack, peel and shear.

To the contrary, in the case of Comparative Example 1 and Comparative Example 3 wherein polar monomers were introduced at the point of near the beginning of the introduction of the monomer mixture during the polymerization reaction, viscosity was relatively low under the same conditions, but shear rapidly decreased. Further, in the case of Comparative Example 2 and Comparative Example 4 wherein polar monomers were not introduced or introduced at the delayed point, adhesive properties were judged to be equivalent, but viscosity increased by about 2 times or more under equivalent solid content conditions of the acrylic emulsion resin, and thus, it can be seen that total process efficiency and productivity were remarkably deteriorated.

The invention claimed is:

1. A process for preparing acrylic emulsion resin, comprising:
    introducing a monomer mixture comprising (meth)acrylic acid ester-based monomers including C1-14 alkyl groups, and a comonomer to initiate an emulsion polymerization reaction;
    conducting the emulsion polymerization reaction; and
    introducing a monomer represented by the following Chemical Formula 1, while conducting the emulsion polymerization by introducing the monomer mixture, to prepare an acrylic emulsion resin, wherein the introduction of the monomer mixture is performed for a total time of 2 hours or more, and the introduction of the monomer represented by Chemical Formula 1 is started at the time from 60% to 93% of the total time after starting the introduction of the monomer mixture:

$R_1$-A-$R_2$       [Chemical Formula 1]

in Chemical Formula 1,
$R_1$ is a functional group including a carbon-carbon unsaturated bond capable of progressing a radical reaction,
A is a single bond, a C1-10 linear or branched alkylene group, or a C6-20 arylene group, and
$R_2$ is sulfonate, sulfite, or sulfate, and
wherein the comonomer is one or more selected from the group consisting of vinyl ester-based monomers, styrene-based monomers, (meth)acrylic acid-based monomers, and hydroxy group-containing (meth)acrylic ester-based monomers.

2. The process according to claim 1, wherein the total time is 2 hours to 8 hours.

3. The process according to claim 1, wherein the introduction of the monomer represented by Chemical Formula 1 is started at the time from 75% to 80% of the total time after starting the introduction of the monomer mixture.

4. The process according to claim 1, wherein
$R_1$ is a C=C double bond structure, and
A is a single bond, a C1-4 linear or branched alkylene group, or a C6-12 arylene group.

5. The process according to claim 1, wherein the monomer represented by Chemical Formula 1 is one or more selected from the group consisting of sodium allyl sulfonate, sodium methyl allyl sulfonate, sodium ethyl allyl sulfonate, sodium propyl allyl sulfonate, sodium butyl allyl sulfonate, sodium styrene sulfonate, and sodium allyl sulfate.

6. The process according to claim 1, wherein the monomer represented by Chemical Formula 1 is introduced in an amount of 0.05 parts by weight to 1.0 part by weight, based on 100 parts by weight of total amount of the (meth)acrylic acid ester-based monomers and the comonomer.

7. The process according to claim 1, wherein the monomer represented by Chemical Formula 1 is introduced in a total amount at once or in divided portions of the total amount at two or more times.

8. The process according to claim 1, wherein the comonomer is included in an amount of 0.1 parts by weight to 30 parts by weight, based on 100 parts by weight of total amount of the (meth)acrylic acid ester-based monomers and the comonomer.

9. The process according to claim 1, wherein the monomer mixture comprises 30 to 90 parts by weight of 2-ethylhexylacrylate, 0 to 40 parts by weight of butylacrylate, 0 to 20 parts by weight of methylmethacrylate, 0 to 20 parts by weight of vinylacetate, 0 to 10 parts by weight of styrene, 0.1 to 5 parts by weight of acrylic acid, and 0 to 5 parts by weight of hydroxyethylacrylate, based on 100 parts by weight of the total amount of the (meth)acrylic acid ester-based monomers and the comonomer.

10. The process according to claim 1, wherein the monomer mixture further comprises an emulsifier, a cross-linking agent, an internal cross-linking agent, an external cross-linking agent, a polymerization initiator, a reducing agent, a buffering agent, a wetting agent, or a molecular weight controlling agent.

11. The process according to claim 1, wherein the emulsion polymerization reaction is carried out by stirring at a temperature of 70° C. to 90° C. for 3 hours to 10 hours in the presence of a polymerization initiator.

12. An aqueous acrylic pressure-sensitive adhesive comprising the acrylic emulsion resin prepared by the process of claim 1.

13. The process according to claim 1, wherein introducing the monomer represented by chemical formula 1 further comprises adding the monomer represented by Chemical Formula 1 to a remaining amount of the monomer mixture to form a second monomer mixture, wherein the remaining amount is that amount of monomer mixture to still be added after the introduction of the monomer mixture, and then introducing the second monomer mixture.

14. A process for preparing acrylic emulsion resin, comprising:

conducting an emulsion polymerization reaction by continuously introducing a monomer mixture for a total time of the emulsion polymerization reaction, wherein the monomer mixture comprises (meth)acrylic acid ester-based monomers including C1-14 alkyl groups, (meth)acrylic acid-based monomers, and a comonomer; and introducing a monomer represented by the following Chemical Formula 1, while conducting the emulsion polymerization reaction by continuously introducing the monomer mixture, to prepare an acrylic emulsion resin, wherein the continuous introduction of the monomer mixture is performed for a total time of 2 hours or more, and the introduction of the monomer represented by Chemical Formula 1 is started at the time from 60% to 93% of the total time after starting the continuous introduction of the monomer mixture:

$$R_1\text{-}A\text{-}R_2 \qquad \text{[Chemical Formula 1]}$$

in Chemical Formula 1, $R_1$ is a functional group including a carbon-carbon unsaturated bond capable of progressing a radical reaction, A is a single bond, a C1-10 linear or branched alkylene group, or a C6-20 arylene group, and $R_2$ is sulfonate, sulfite, or sulfate, and wherein the comonomer is one or more selected from the group consisting of vinyl ester-based monomers, styrene-based monomers, and hydroxy group-containing (meth)acrylic ester-based monomers.

* * * * *